(12) United States Patent
Nolan

(10) Patent No.: US 10,324,712 B1
(45) Date of Patent: Jun. 18, 2019

(54) METHOD AND SYSTEM OF MIGRATING LEGACY CODE FOR UPGRADED SYSTEMS

(71) Applicant: Thomas A. Nolan, Angleton, TX (US)

(72) Inventor: Thomas A. Nolan, Angleton, TX (US)

( * ) Notice: Subject to any disclaimer, the term of this patent is extended or adjusted under 35 U.S.C. 154(b) by 0 days.

(21) Appl. No.: 14/944,105

(22) Filed: Nov. 17, 2015

Related U.S. Application Data

(60) Provisional application No. 62/096,765, filed on Dec. 24, 2014.

(51) Int. Cl.
| | | |
|---|---|---|
| *G06F 9/44* | (2018.01) | |
| *G06F 8/76* | (2018.01) | |
| *G06F 8/41* | (2018.01) | |
| *G06F 8/72* | (2018.01) | |
| *G06F 8/10* | (2018.01) | |

(52) U.S. Cl.
CPC ............... *G06F 8/76* (2013.01); *G06F 8/10* (2013.01); *G06F 8/41* (2013.01); *G06F 8/72* (2013.01)

(58) Field of Classification Search
CPC .......... G06F 8/36; G06F 8/41–42; G06F 8/51; G06F 8/76; G06F 8/427; G06F 8/443; G06F 8/447
See application file for complete search history.

(56) References Cited

U.S. PATENT DOCUMENTS

| | | | | |
|---|---|---|---|---|
| 5,185,867 A * | 2/1993 | Ito | ............................ | G06F 8/10 717/143 |
| 5,768,564 A * | 6/1998 | Andrews | ................... | G06F 8/33 707/999.101 |
| 6,212,677 B1 * | 4/2001 | Ohkubo | .................... | G06F 8/75 717/143 |
| 6,578,195 B1 * | 6/2003 | Zaringhalam | ............ | G06F 8/76 717/116 |
| 7,370,318 B1 * | 5/2008 | Howe | ................... | G06F 8/4441 717/110 |
| 7,788,640 B2 * | 8/2010 | Grimaldi | ................... | G06F 8/73 717/120 |
| 2002/0029231 A1 * | 3/2002 | Aptus | ....................... | G06F 8/20 715/210 |
| 2005/0138603 A1 * | 6/2005 | Cha | ........................... | G06F 8/74 717/120 |
| 2005/0166193 A1 * | 7/2005 | Smith | ....................... | G06F 8/75 717/143 |
| 2007/0033572 A1 * | 2/2007 | Donovan | .................. | G06F 8/47 717/106 |
| 2007/0234285 A1 * | 10/2007 | Mendoza | .................. | G06F 8/51 717/114 |
| 2007/0256058 A1 * | 11/2007 | Marfatia | ................... | G06F 8/51 717/137 |
| 2008/0306986 A1 * | 12/2008 | Doyle, Sr. | ................ | G06F 8/51 |

(Continued)

*Primary Examiner* — Duy Khuong T Nguyen
(74) *Attorney, Agent, or Firm* — Plager Schack LLP; Mark H. Plager; Alexis Saenz

(57) ABSTRACT

A method of maintaining or improving functionality of legacy code for operation in a new machine system is disclosed. Reference code and documentation are leveraged to provide functionality of the machine system. The sections may be identified and presented as user defined representations (for example, pseudocode, diagrams, descriptive text, or encapsulations) so that the reference code may be migrated to a newer machine system and the sections may be re-written as necessary to make the sections of reference compatible with the new machine system.

8 Claims, 5 Drawing Sheets

(56) References Cited

U.S. PATENT DOCUMENTS

| | | | |
|---|---|---|---|
| 2009/0313613 A1* | 12/2009 | Ben-Artzi | G06F 8/51 717/137 |
| 2010/0169234 A1* | 7/2010 | Metzger | G06Q 10/067 705/348 |
| 2012/0192151 A1* | 7/2012 | Parkes | G06F 8/10 717/120 |
| 2012/0259909 A1* | 10/2012 | Bachelor | G06N 3/02 709/201 |
| 2013/0086556 A1* | 4/2013 | Grechanik | G06F 11/3684 717/126 |
| 2014/0013304 A1* | 1/2014 | Vangala | G06F 8/75 717/123 |
| 2014/0282373 A1* | 9/2014 | Garza | G06F 8/51 717/106 |
| 2016/0062753 A1* | 3/2016 | Champagne | G06F 8/51 717/137 |

* cited by examiner

METHOD AND SYSTEM OF MIGRATING LEGACY CODE FOR UPGRADED SYSTEMS

CROSS-REFERENCE TO RELATED APPLICATIONS

This application claims benefit under 35 U.S.C. § 119(e) of U.S. Provisional Application having Ser. No. 62/096,765 filed Dec. 24, 2014, which is hereby incorporated by reference herein in its entirety.

BACKGROUND

The embodiments herein relate generally to methods for migrating software in machine systems with the same or improved functionality to a targeted system.

A major concern in moving from an older legacy system to a newer one is knowing that the system will perform as desired when it is in operation on a new machine system. The functionality needed between legacy and newer (or older or different) systems often remains the same. Yet the code used in older legacy systems is often not readable or understood by the new machine system or by those programming the new machine system. Typically, the code format or style for one system becomes old or its comprehension lost when newer or different versions of a system are put into operation. However, the functionality present in older legacy systems remains valuable if not necessary when migrating to the newer system.

As can be seen, there is a need to migrate legacy code for comprehension and use in newer, different, or upgraded machine systems.

SUMMARY

In one aspect of the invention, a method of migrating legacy source code for use in a targeted system comprises obtaining a legacy source code and documentation related to the legacy source code; identifying a functional element(s) in the legacy source code; mapping the identified functional element in the legacy source code to a user defined representation(s); compiling the legacy source code using a configurable explicative compiler to present a functional specification with the user defined representation(s) in a person readable language that is higher than machine language; and migrating the compiled legacy source code with the functional specification into the targeted system.

In another aspect of the invention, a computer program product providing a configurable explicative compiler for use in migrating legacy source code to a targeted system comprises a non-transitory computer readable storage medium having computer readable program code embodied therewith. The computer readable program code is configured to: identify a functional element(s) in the legacy source code; map the identified functional element(s) in the legacy source code to a user defined representation(s); and compile the legacy source code by presenting present a functional specification with the user defined representation(s) in a person readable language that is higher than machine language.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
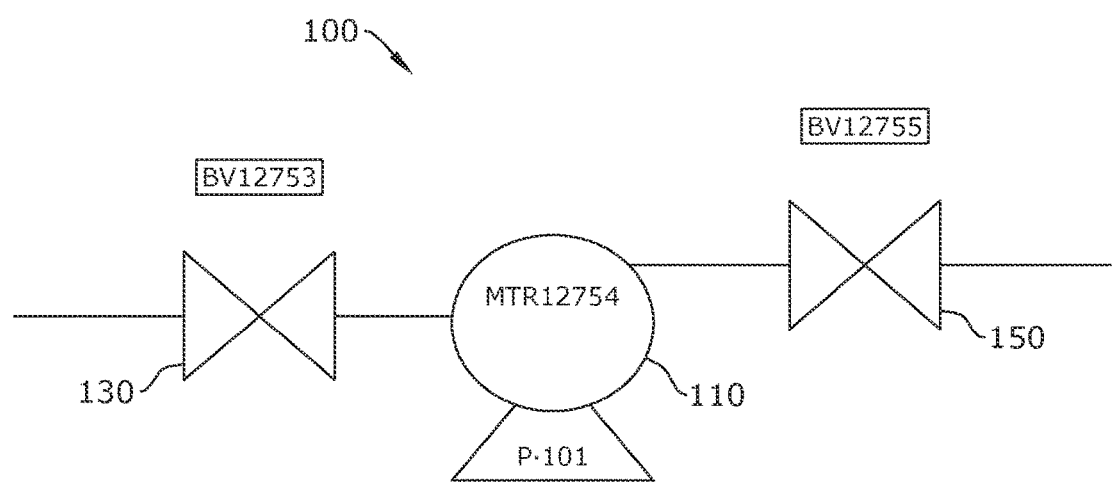
FIG. 1 is a schematic of a pump system running migrated source code according to an embodiment of the subject technology.

Broadly, embodiments of the disclosed invention leverage the legacy code of an older system and its documentation to create new documentation in view of the old that can be migrated to a new system with uninterrupted functionality. Aspects of the present invention include examining code structures, encapsulation and refactoring. In addition, aspects enable maintaining or improving functionality of legacy code for operation in a new machine system. As may be appreciated, the method disclosed allows the user to capture the functionality of the legacy machine in a platform independent manner in that once captured, the functionality can be taken forward to different computer languages or computer platforms. It also allows for the leveraging of proven in-use source code functionality to whatever application the user desires. It also allows the user to modify and improve the functionality in the code specification to improve the functionality and performance on the new machine if improved functionality is desired. In addition, aspects of the subject technology allow the user to mine existing functionality that they have and enables them to create reusable specifications that can be used to migrate the system at hand, or be used to create new applications for other projects, thus leveraging machine functionality they have from legacy systems to new applications.

In one exemplary embodiment, the present invention is a process with associated software that leads the user through the reverse engineering process to enable the user to create a platform independent functional specification from the legacy source code. The specification is presented as representations of the functionality in the form of pseudocode, diagrams, descriptive text, encapsulations, or tables. Encapsulations can be created around legacy code to create specifications for the encapsulations with a communication vector similar to an argument list over the encapsulation boundary provided by the user. The specification can reuse the encapsulations and use them in layers as well with encapsulations within encapsulations. In general, aspects of the subject technology provide unambiguous pseudocode and diagrams based on the legacy code so there is little room for misinterpretation in the migration process. Aspects show how the existing functionality of the source code is captured in the specification of the targeted code of the system. This may provide confidence that the system will perform as desired on the targeted system. The functionality is accounted for. Essentially code accounting. The specification can be read and understood by practitioners of the legacy and targeted systems software. Aspects of the subject technology allow for maintaining or improving the functionality through the reverse engineering process.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Referring now to FIG. 1, a graphic of a pump system 100 with a pump 110, an intake valve 130 and discharge valve 150 is shown. The pump system 100 may represent a section of a larger system (not shown) that may be part a legacy machine system employing legacy code. The pump system 100 may also represent a targeted updated system receiving migrated and updated code. While a pump type system is shown, it will be understood that other machine systems may benefit from and use aspects of the subject technology, and that the pump system may be part of a larger machine. Aspects of the subject technology are described below in an exemplary use to control the operation of the pump 110, the intake valve 130 and discharge valve 150.

Figure 2:
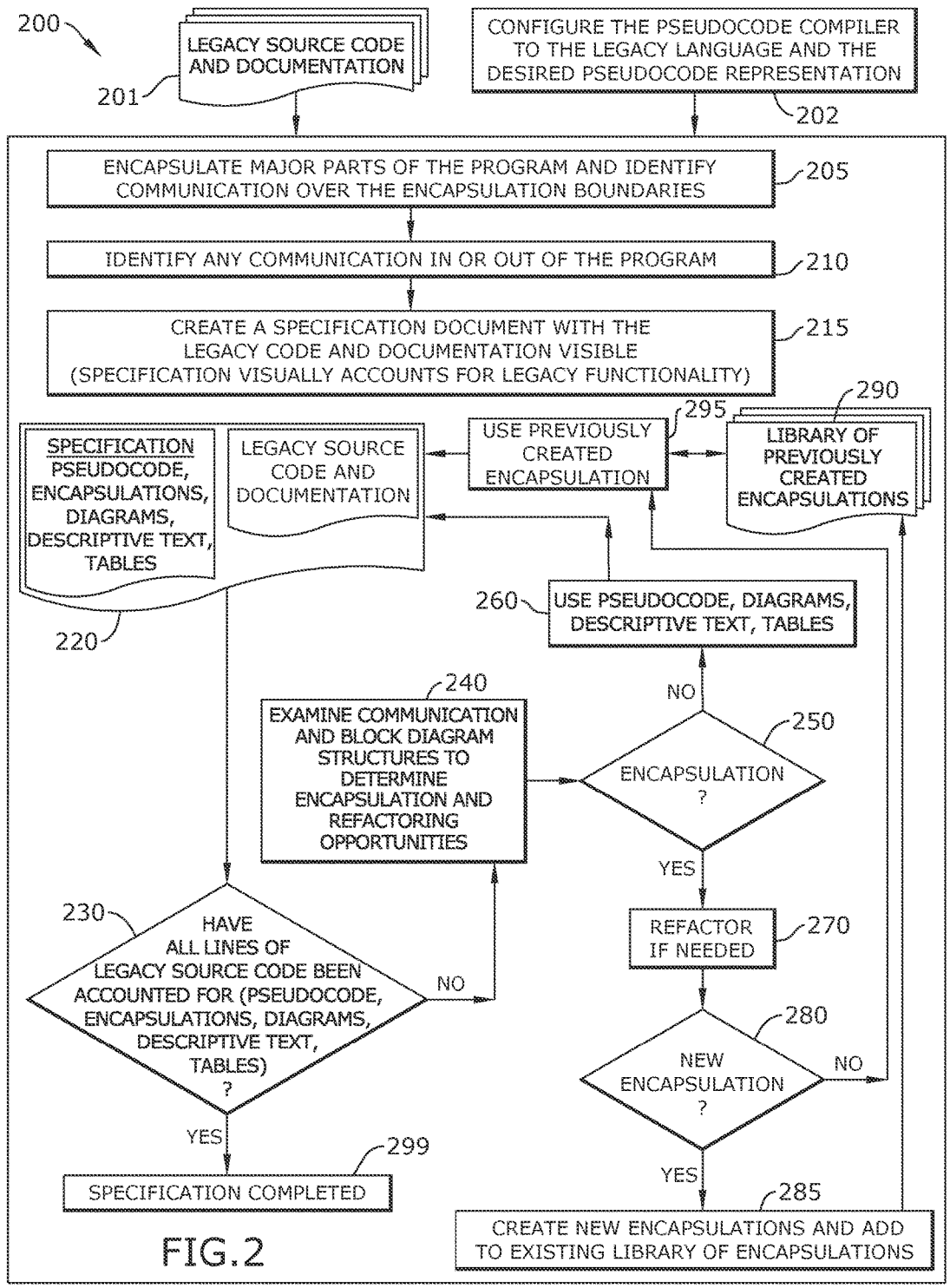
FIG. 2 is a flowchart of a method of migrating legacy code for an upgraded system according to an embodiment of the subject technology.

Referring now to FIG. 2 (with repeating reference back to elements of FIG. 1), a method 200 for implementing a legacy conversion process is shown according to an exemplary embodiment. Reference to FIG. 2 should be made concurrently with the following tables of code that represent a functional specification within the legacy source code. For sake of illustration, only a part of the legacy source code in the form of an identified specification is shown. The tables are shown as a series of developments or as specific features implementing the processes of the subject technology to code the specification. Aspects of the subject technology are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The process 200 begins by obtaining the legacy source code and documentation. Table 1 shows an example of an identified specification within reference legacy code and documentation for the pump system 100. The process accesses the reference, existing code in the old system. The user can use the processes disclosed to get as much value as they think is appropriate from the older code and can stop at any point they feel they have captured the value they want.

TABLE 1

| Reference Code |
|---|
| C P-101 Code For pump motor intake and discharge valves |
| C START THE PUMP P-101 IF THE C2 SPLITTER IS SEEN TO BE IN THE RIGHT PROCESS STATES |
| C AND THE REACTOR RUNNINGS WITH SUFFICIENT LEVEL AND NO TOO HOT |
| MTR12754 IF [STATE_116 OR STATE_117] AND STATE_233 AND LI12757 GE D147_PSLL AND #TI12756_H |
| C OPEN THE INTAKE VALVE WHEN THE PUMP STARTS |
| BV12753 IF [STATE_116 OR STATE_117] AND STATE_233 AND LI12757 GE D147_PSLL AND #TI12756_H |
| C OPEN THE DISCHARGE VALVE WHEN THE INTAKE VALVE IS CONFIRMED OPEN |
| BV12755 IF [STATE_116 OR STATE_117] AND STATE_233 AND LI12757 GE D147_PSLL AND #TI12756_H AND #ZSC12753 |

Figure 4:
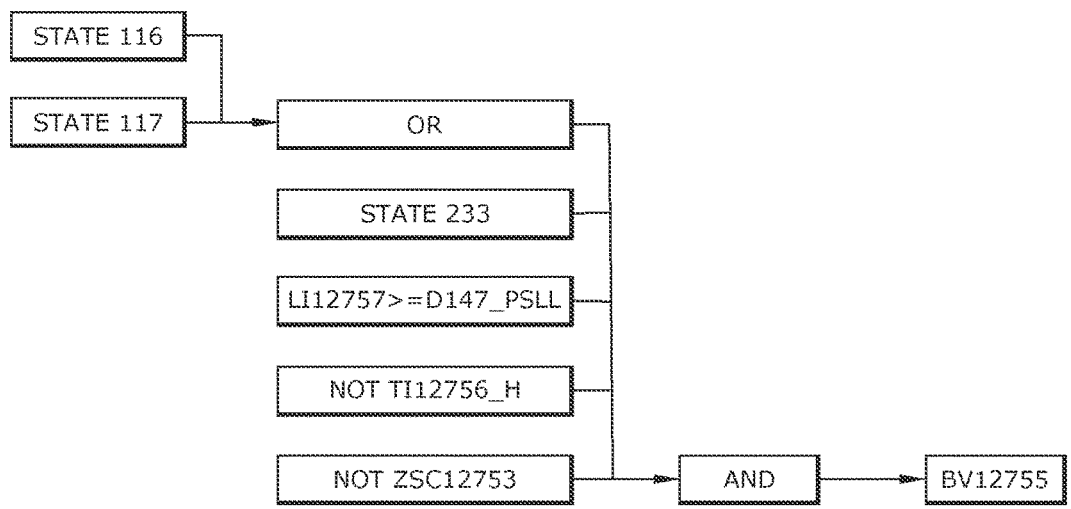
FIG. 4 is an enlarged view of a block diagram integrated within Table 4.

In block 202, a pseudocode compiler may be configured to take the legacy source code to a functional specification with user defined representations in a person readable language that is higher than machine language. In comparison, conventional compilers typically take a specific higher-level source code language to machine code for the computer to run. The process 200 takes the higher-level source code language and explicates it to a functional specification for humans to read based on the user's configuration. The compiler is configurable to recognize aspects of the legacy code and configurable in how aspects of the code will be displayed in the functional specification. The user may configure the compiler to explicate code to reveal the functionality, in the user's terms, to reveal the meaning. The compiler may recognize user identified elements and recognize overheads functionality of the legacy code and map them to user defined desired compiled representations. For example, in Table 2, the compiler may recognize in the reference code usage of the term "GE" and using for example, pseudocode, use the carat symbol ">=" to explicate that "GE" means there is an inequality statement present within the code. The user could also configure the compiler to explicate "GE" as the text "Equal to or Greater Than". Whatever the user thinks best explicates the functionality. Thus the user is provided a quick reference as to functionality present in the reference code. With respect to overheads functionality, for example, the compiler can identify elements in the legacy source code that would for example cause the overheads to cause a pause in the current state. The compiler may write out the specification for this and other otherwise unseen functionality that would take place in the legacy overheads. In some embodiments, the compiler may also represent functionality within block diagrams. Referring to FIG. 4, a block diagram that would be normally be visible in Table 2 (but is not shown in the table by patent rule) is shown. The block diagram shows use of the carat symbol ">=" to explicate that "GE" means there is an inequality statement present within process.

TABLE 2

| Accounting | Pseudocode | Comments | Reference Code |
|---|---|---|---|
| Comment | | | C P - 101 Code For pump motor intake and discharge valves |
| Comment | | | C START THE PUMP P-101 IF THE C2 SPLITTER IS SEEN TO BE IN THE RIGH PROCESS STATES |
| Comment | | | C AND THE REACTOR RUNNINGS WITH SUFFICIENT LEVEL AND NO TOO HOT |
| Pseudocode | MTR12754 = [ STATE_116 OR STATE_117 ] AND STATE_233 AND LI12757 >= D147_PSLL AND Not TI12756_H | | MTR12754 IF [ STATE_116 OR STATE_117 ] AND STATE_233 AND LI12757 GE D147_PSLL AND #TI12756_H |
| Comment | | | C OPEN THE INTAKE VALVE WHEN THE PUMP STARTS |
| Pseudocode | BV12753 = [ STATE_116 OR STATE_117 ] AND STATE_233 AND LI12757 >= D147_PSLL AND Not TI12756_H | | BV12753 IF [ STATE_116 OR STATE_117 ] AND STATE_233 AND LI12757 GE D147_PSLL AND #TI12756_H |
| Comment | | | C OPEN THE DISCHARGE VALVE WHEN THE INTAKE VALVE IS CONFIRMED OPEN |
| Block Diagram | | | C |
| Pseudocode | BV12755 = [ STATE_116 OR STATE_117 ] AND STATE_233 AND LI12757 >= D147_PSLL AND Not TI12756_H AND Not #ZSC12753 | | BV12755 IF [ STATE_116 OR STATE_117 ] AND STATE_233 AND LI12757 GE D147_PSLL AND #TI12756_H AND #ZSC12753 |

The process 200 may continue by determining (blocks 205 and 210) the communication vector(s) in and out of the legacy system and major parts of the system. Knowing the communication over the boundaries of the major parts of the system enables the division of the system, as may be required by the targeted system constraints, current best practices, to comply with regulations or simply with user desire, with no unintended change in functionality. These steps allow for creating a specification for the communication vectors to major parts of the system as desired by the user. It also permits existing communication with other systems so that the communication can be maintained throughout the migration. In block 215 an initial specification document is compiled in the form seen in Table 3 using for example an initial pseudocode description and additional column descriptors. The pseudocode is presented at a language higher than machine code that can be read by a person to more easily understand the functionality present. Columns that may be added to document include: "Accounting" (how the legacy code is accounted for); "Encapsulations" (to document the encapsulation library and instantiation names); "Imported" (list the communication data imported into the boundary); "Calculated" (list calculations made in the encapsulation; a separate page not shown is used to document the communication vectors identified in blocks 205 and 210 above); "Pseudocode" (displays the pseudocode (two pseudocode views are available: a normal more easily related to the legacy code or descriptive view that provides additional functional information)); "Comments" (for any descriptive text); and "Reference Code" (the legacy code and comments allowing the user to view what the legacy system did in view of the specification to be taken to the targeted system).

TABLE 3

| Accounting | Encapsulations | Imported | Calculated | Pseudocode | Comments | Reference Code |
|---|---|---|---|---|---|---|
| Start Boundary | Lib_EN_PUMP-P-101 | STATE_116 | MTR12754 | | | Start_Lib_EN_PUMP-P-101 |
| Comment | Lib_EN_PUMP-P-101 | STATE_117 | BV12753 | | | C |
| Comment | Lib_EN_PUMP-P-101 | STATE_233 | BV12755 | | | C |
| Comment | Lib_EN_PUMP-P-101 | LI12757 | | | | C START THE PUMP P-101 IF THE C2 SPLITTER IS SEEN TO BE IN THE RIGH PROCESS STATES |
| Comment | Lib_EN_PUMP-P-101 | D147_PSLL | | | | C AND THE REACTOR RUNNINGS WITH SUFFICIENT LEVEL AND NO TOO HOT |
| Comment | Lib_EN_PUMP-P-101 | TI12756_H | | | | C |
| Lib_EN_PUMP | Lib_EN_PUMP-P-101 | ZSC12753 | | MTR12754 = [STATE_116 OR STATE_117] AND STATE_233 AND LI12757 >= D147_PSLL AND Not TI12756_H | | MTR12754 IF [STATE_116 OR STATE_117] AND STATE_233 AND LI12757 GE D147_PSLL AND #TI12756_H |
| Comment | Lib_EN_PUMP-P-101 | | | | | C OPEN THE INTAKE VALVE WHEN THE PUMP STARTS |
| Lib_EN_PUMP | Lib_EN_PUMP-P-101 | | | BV12753 = [STATE_116 OR STATE_117] AND STATE_233 AND LI12757 >= D147_PSLL AND Not TI12756_H | | BV12753 IF [STATE_116 OR STATE_117] AND STATE_233 AND LI12757 GE D147_PSLL AND #TI12756_H |

TABLE 3-continued

| Accounting | Encapsulations | Imported | Calculated | Pseudocode | Comments | Reference Code |
|---|---|---|---|---|---|---|
| Comment | Lib_EN_PUMP-P-101 | | | | | C OPEN THE DISCHARGE VALVE WHEN THE INTAKE VALVE |
| Lib_EN_PUMP | Lib_EN_PUMP-P-101 | | | BV12755 = [STATE_116 OR STATE_117] AND STATE_233 AND LI12757 >= D147_PSLL AND Not TI12756_H AND Not ZSC12753 | | IS CONFIRMED OPEN BV12755 IF [STATE_116 OR STATE_117] AND STATE_233 AND LI12757 GE D147_PSLL AND #TI12756_H AND #ZSC12753 |
| End Boundary | Lib_EN_PUMP-P-101 | | | | | End_Lib |

The result from block 215 is represented in block 220, which provides code accounting and an explicative functional specification. The elements of block 220 may be added to and modified in an iterative fashion until completion block 299.

In block 230, an iterative process of determining if all of the legacy system has been accounted for and how it will be documented in the specification is shown. In block 240, a determination of whether there is value in creating encapsulations for sections of the legacy systems may be made. The determination can be made by studying code structures, by converting lines of code to block diagrams for study, or by encapsulating a section to examine the communication vector over the proposed encapsulation. An example is shown in Table 3 which adds a "Start Boundary" and "End Boundary" entry in the Accounting column which define the encapsulation boundary. In block 250, a decision on whether the functionality in a section will be accounted for by an encapsulation or not may be made.

Figure 5:
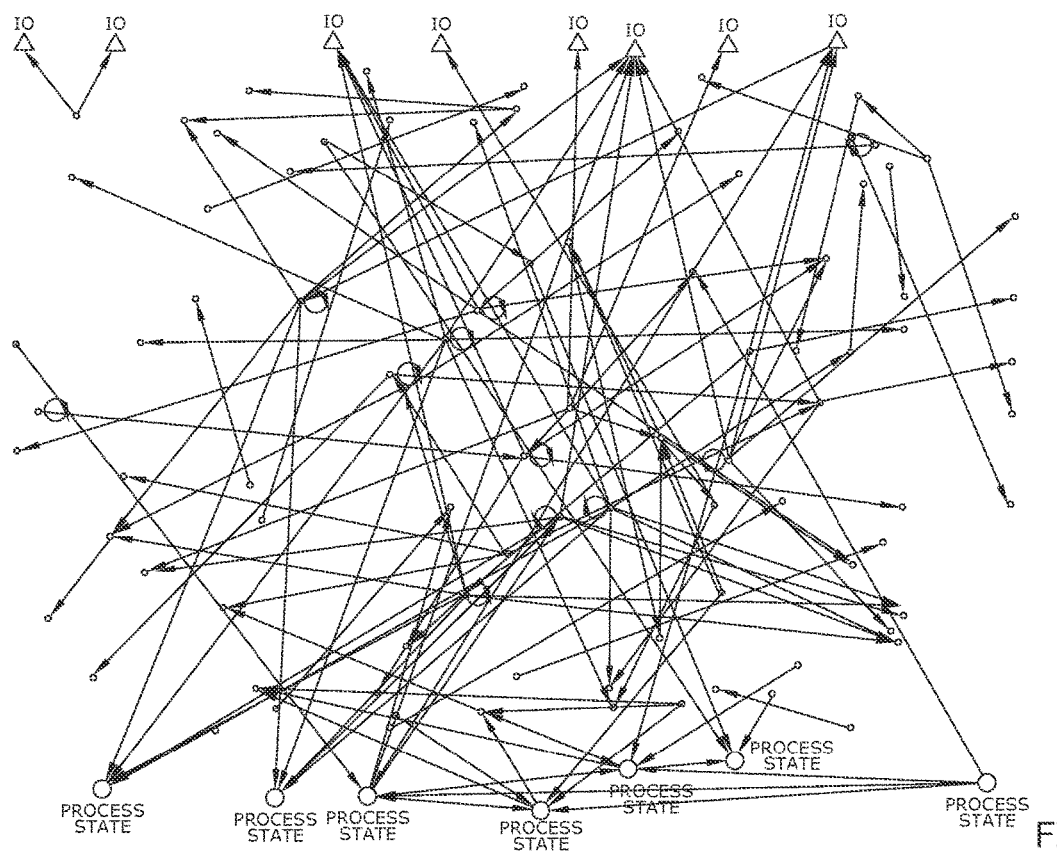
FIG. 5 is a diagram of legacy code written to perform a desired functionality of the type shown in Table 1.
Figure 6:
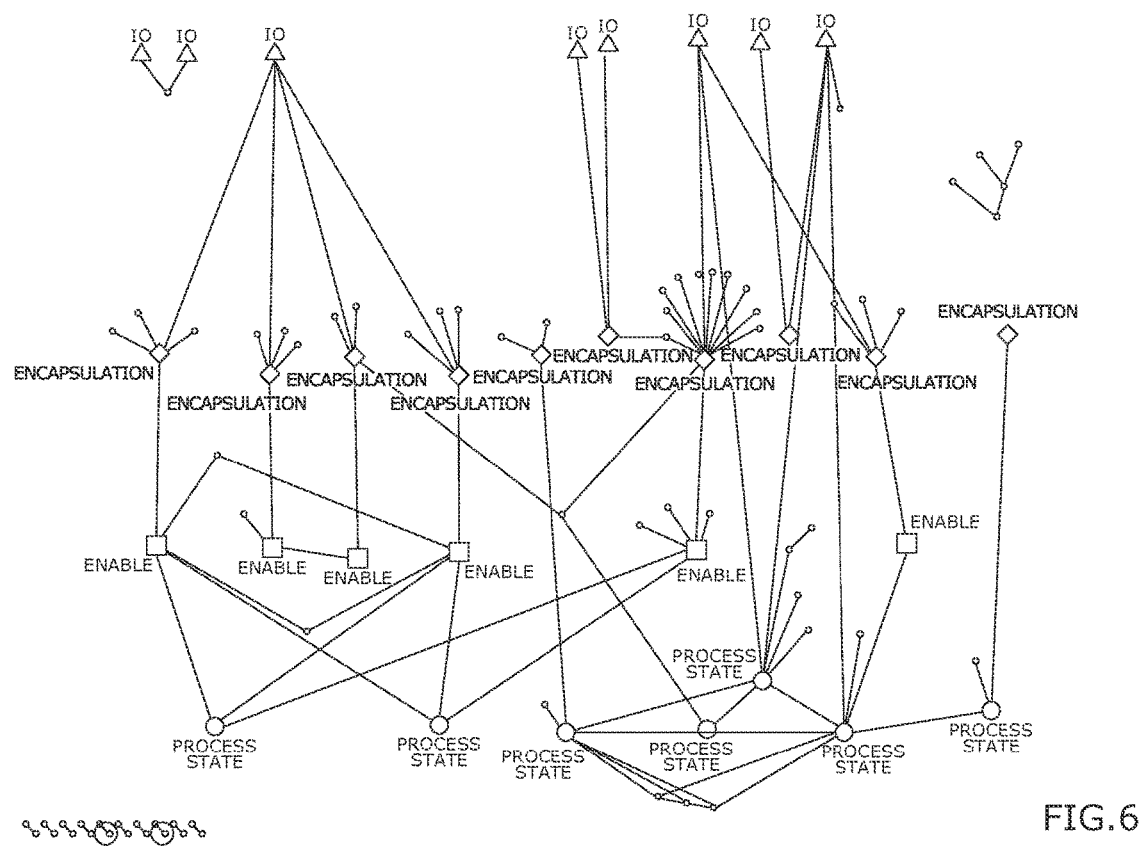
FIG. 6 is a diagram of code with the identical functionality as seen in FIG. 5 incorporating user defined representations and encapsulation features according to exemplary embodiments of the subject technology.

Referring temporarily to FIGS. 5 and 6, FIG. 5 shows code in a legacy format. FIG. 6 shows code that has been refactored into encapsulations of the same functionality as the legacy format code of FIG. 5. The circles at the bottom of the two diagrams are process state. The black dots are calculations within the legacy code and the triangles are inputs and outputs of the system. The lines between the above-mentioned circles, black dots and triangles show the communication between them. FIG. 6 shows the legacy code (with the user defined representations compiled as described above) that has been refactored into an architecture that takes advantage of reusable encapsulations. The diamonds are encapsulations of code that performs a common function such as may be seen in Table 4 below between the Start Boundary and End Boundary. The squares are enables that are unique pieces of code, such as Flow_Requested in Table 4. As may be appreciated, there is a great deal of value provided to the user in maintaining (or improving) the functionality in a more robust reusable architecture as disclosed. There is less code to write and maintain since the encapsulations are used. Less testing and review is needed since aspects of the disclosed process leverage proven technology. The communication and need to re-tag variables is less because not everything calculated in an encapsulation needs to be exposed. The architecture can be designed into existing standard formats like unit, equipment and control modules enabling the ability to more easily use modern systems, which conform to the ISA standards. If no encapsulation from block 250 accounts for functionality, then in block 260 the system may decide on and create the functional description in pseudocode, diagrams, descriptive text, or tables and modify the elements of block 220 accordingly.

In block 270, refactoring may be performed to separate those factors that are reusable in a general sense as an encapsulation from those that are unique to the particular instantiation. As an example the Flow_Requested pseudocode in Table 4 is unique to that instantiation, the rest is reusable. Once the unique and reusable factors are separated the unique factor can be used as input to the call for the instantiation of the encapsulation as in table 4. In block 280, a decision may be made as to whether the encapsulation is new or an existing encapsulation. If the encapsulation is new then in block 285, a specification for the encapsulation may be created and it can be added to the library. If the encapsulation exists in the encapsulation library, then in block 290, it can just be called with the unique factor referenced above. The specification for the encapsulations is in the same form as the main specification, pseudocode, diagrams, descriptive text, and tables. They may, as in the main part of the specification, make calls to other encapsulations. So there can be any number of layers of encapsulations. Code artifacts can be made for specific platforms or multiple platforms from these specifications and reused as indicated in the specification. In block 295, existing encapsulations may be re-used as needed. The specification is complete in block 299.

TABLE 4

| Accounting | Encapsulations | Imported | Calculated | Pseudocode | Comments | Reference Code |
|---|---|---|---|---|---|---|
| pseudocode | Lib_EN_PUMP | STATE_116 | | FLOW_REQUESTED = [STATE_116 OR STATE_117 ] AND STATE_233 AND LI12757 >= D147_PSLL AND Not TI12756_H | | Flow_Requested IF [STATE_116 OR STATE_117] AND STATE_233 AND LI12757 GE D147_PSLL AND #TI12756_H |
| Start Boundary | Lib_EN_PUMP | FLOW_REQUESTED | Pump_Motor | | | Start_Lib_EN_PUMP-P-101 |
| Comment | Lib_EN_PUMP | Intake_Valve_Closed | Intake_Valve | | | C |
| Comment | Lib_EN_PUMP | | Discharge_Valve | | | C |
| Comment | Lib_EN_PUMP | | | | | C START THE PUMP P-101 IF THE C2 SPLITTER IS SEEN TO BE IN THE RIGH PROCESS STATES |

TABLE 4-continued

| Accounting | Encapsulations | Imported | Calculated | Pseudocode | Comments | Reference Code |
|---|---|---|---|---|---|---|
| Comment | Lib_EN_PUMP | | | | | C AND THE REACTOR RUNNINGS WITH SUFFITIENT LEVEL AND NO TOO HOT |
| Lib_EN_PUMP | Lib_EN_PUMP | | | Pump_Motor = FLOW_REQUESTED | | Pump_Motor IF Flow_Requested |
| Comment | Lib_EN_PUMP | | | | | C OPEN THE INTAKE VALVE WHEN THE PUMP STARTS |
| Lib_EN_PUMP | Lib_EN_PUMP | | | Intake_Valve = FLOW_REQUESTED | | Intake_Valve IF Flow_Requested |
| Comment | Lib_EN_PUMP | | | | | C OPEN THE DISCHARGE VALVE WHEN THE INTAKE VALVE IS CONFIRMED OPEN |
| Lib_EN_PUMP | Lib_EN_PUMP | | | Discharge_Valve = FLOW_REQUESTED AND Not Intake_Valve_Closed | | Discharge_Valve IF Flow_Requested AND #Intake_Valve_Closed |
| End Boundary | Lib_EN_PUMP | | | | | End_Lib |

In some embodiments, functionality may be added to make improvements in the specification. An example is shown in Table 5 which adds a graphic light when the pump 110 is requested to be on. For sake of illustration, the specification in Table 5 is only a portion of the specification shown in for example Table 4 to show the feature of added functionality. As will be understood, additional features/functions may be added before the end boundary.

As referenced earlier, Table 6 discloses another embodiment which provides a column with pseudocode in descriptive view. The descriptive view provides another user defined representation tool that helps the legacy code be comprehensible by function which can be adapted for migration to a target system. The descriptive view pseudocode feature may be used to provide explicative reference to reference code elements. The compiler may provide descrip-

TABLE 5

| Accounting | Encapsulations | Imported | Calculated | Pseudocode | Comments | Reference Code |
|---|---|---|---|---|---|---|
| pseudocode | | | | FLOW_REQUESTED = [STATE_116 OR STATE_117] AND STATE_233 AND LI12757 >= D147_PSLL AND Not TI12756_H | | Flow_Requested IF [STATE_116 OR STATE_117] AND STATE_233 AND LI12757 GE D147_PSLL AND #TI12756_H |
| Start Boundary | Lib_EN_PUMP | FLOW_REQUESTED | Pump_Motor | | | Start_Lib_EN_PUMP-P-101: |
| Comment | Lib_EN_PUMP | Intake_Valve_Closed | Intake_Valye | | | C |
| Comment | Lib_EN_PUMP | | Discharge_Valve | | | C |
| Comment | Lib_EN_PUMP | | Graphic_Light | | | C START THE PUMP P-101 IF THE C2 SPLITTER IS SEEN TO BE IN THE RIGH PROCESS STATES |
| Comment | Lib_EN_PUMP | | | | | C AND THE REACTOR RUNNINGS WITH SUFFITIENT LEVEL AND NO TOO HOT |
| Lib_EN_PUMP | Lib_EN_PUMP | | | Pump_Motor = FLOW_REQUESTED | | Pump_Motor IF Flow_Requested |
| Comment | Lib_EN_PUMP | | | | | C OPEN THE INTAKE VALVE WHEN THE PUMP STARTS |
| Lib_EN_PUMP | Lib_EN_PUMP | | | Intake_Valve = FLOW_REQUESTED | | Intake_Valve IF Flow_Requested |
| Comment | Lib_EN_PUMP | | | | | C OPEN THE DISCHARGE VALVE WHEN THE INTAKE VALVE IS CONFIRMED OPEN |
| Lib_EN_PUMP | Lib_EN_PUMP | | | Discharge_Valve = FLOW_REQUESTED AND Not Intake_Valve_Closed | | Discharge_Valve IF Flow_Requested AND #Intake_Valve_Closed |
| Comment | Lib_EN_PUMP | | | | | C Turn on the graphic light if the pump is requested on |
| Lib_EN_PUMP | Lib_EN_PUMP | | | Graphic_Light = FLOW_REQUESTED | | Graphic_Light IF Flow_Requested | tion of reference code elements that can be searched. For example, if the user wanted to know the functionality related to the command "#TI12756_H", the descriptive view pseudocode feature may indicate it is related to an alarm function (in the example shown, an alarm is not triggered).

or processing units 16, a system memory 28, and a bus 18 that couples various system components including the system memory 28 to the processor 16. The computer system/server 10 may be described in the general context of computer system executable instructions, such as program

TABLE 6

| Accounting | Encapsulations | Imported | Calculated | Descriptive View Pseudocode | Comments | Reference Code |
|---|---|---|---|---|---|---|
| pseudocode | | | | BOOLEAN_CALCU-LATION_FLOW_REQUESTED = [PROCESS_STATE_116 OR PROCESS_STATE_117] AND PROCESS_STATE_233 AND ANALOG_INDICA-TION_ LI12757 >= ANALOG_CON-STANT_ D147_PSLL AND Not ALARM _TI12756_H | | Flow_Requested IF [STATE_116 OR STATE_117] AND STATE_233 AND LI12757 GE D147_PSLL AND #TI12756_H |
| Start Boundary | Lib_EN_PUMP | FLOW_REQUESTED | Pump_Motor | | | Start_Lib_EN_PUMP-P-101: |
| Comment | Lib_EN_PUMP | Intake_Valve_Closed | Intake_Valve | | | C |
| Comment | Lib_EN_PUMP | | Discharge_Valve | | | C |
| Comment | Lib_EN_PUMP | | Graphic_Light | | | C START THE PUMP P-101 IF THE C2 SPLITTER IS SEEN TO BE IN THE RIGH PROCESS STATES |
| Comment | Lib_EN_PUMP | | | | | C AND THE REACTOR RUNNINGS WITH SUFFITIENT LEVEL AND NO TOO HOT |
| Lib_EN_PUMP | Lib_EN_PUMP | | | Digital_Output_Pump_Motor = BOOLEAN_CALCU-LATION_FLOW_REQUESTED | | Pump_Motor IF Flow_Requested |
| Comment | Lib_EN_PUMP | | | | | C OPEN THE IN-TAKE VALVE WHEN THE PUMP STARTS |
| Lib_EN_PUMP | Lib_EN_PUMP | | | Digital_Output_Intake_Valve = BOOLEAN_CALCU-LATION_FLOW_REQUESTED | | Intake_Valve IF Flow_Requested |
| Comment | Lib_EN_PUMP | | | | | C OPEN THE DIS-CHARGE VALVE WHEN THE INTAKE VALVE IS CONFIRMED OPEN |
| Lib_EN_PUMP | Lib_EN_PUMP | | | Discharge_Valve = BOOLEAN_CALCU-LATION_FLOW_REQUESTED AND Not Digital_Input_Intake_Valve_Closed | | Discharge_Valve IF Flow_Requested AND #Intake_Valve_Closed |
| Comment | Lib_EN_PUMP | | | | | C Turn on the graphic light if the pump is requested on |
| Lib_EN_PUMP | Lib_EN_PUMP | | | Digital_Output_Graphic_Light = BOOLEAN_CALCU-LATION_FLOW_REQUESTED | | Graphic_Light IF Flow_Requested |

Figure 3:
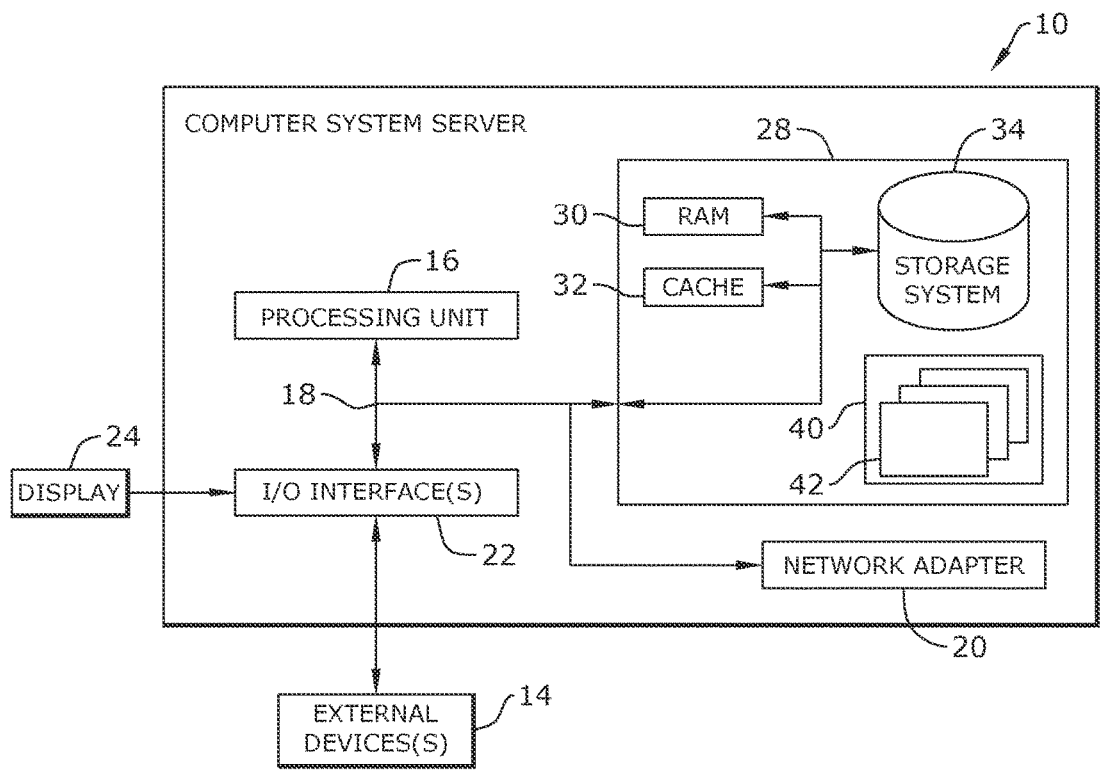
FIG. 3 is a block diagram of a general computing device for running processes according to an embodiment of the subject technology.

Referring now to FIG. 3, a schematic of an example of a computer system/server 10 is shown. The computer system/server 10 is shown in the form of a general-purpose computing device. In one context, the computer system/server 10 is the machine compiling legacy reference code into configurable, explicative code. In another context, computer system/server 10 is the machine installed on or connected to the system 100 (FIG. 1) for migrating the legacy code and/or implementing the legacy code as executable on the target system. In another context, computer system/server 10 is the machine storing the legacy code converted into a functional specification with the user defined representations in a person readable language that is higher than machine language. The components of the computer system/server 10 may include, but are not limited to, one or more processors modules, being executed by a computer system, for example, in the form of a compiler as described above.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention for example as described above. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts described herein. The program modules 42 generally carry out the functions and/or methodologies of embodiments of the invention as described above with relation to reading the functional portions of the specification that are presented as user defined representations (for example, pseudocode, diagrams, descriptive text, or encapsulations) and executing the lines of code in the specification in the target system with the pseudocode, diagrams, descriptive text, or encapsulations. It will be appreciated that aspects of the disclosed processes improve the functionality in targeted systems by improving the efficiency, understanding of, and migration of usable legacy source code into different machines/systems requiring the same functionality as legacy systems without having to reconstruct an entirely new specification from scratch.

In operation, the computer system/server 10 may also communicate with one or more external devices 14 such as the valves 130 and 150 (FIG. 1) in the context of migrating code and controlling the system 100, or with a keyboard, a pointing device, a display 24, etc.; and/or any devices (e.g., network card, modem, etc.) in the context of enabling the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method of migrating legacy source code from a legacy system for use in a targeted system, comprising:
    obtaining a legacy source code from a legacy machine;
    identifying an operational function performed by the legacy machine in the legacy source code independent of a platform source of the legacy source code;
    refactoring, by a processor, independent of the platform source, the legacy source code by encapsulating the identified operational function with a user defined representation of the identified function;
    compiling, by the processor, the refactored legacy source code using a configurable explicative compiler to present the encapsulated identified function as an operating specification of functions using the user defined representation(s), in a person readable language that is higher than machine language and independent of an operating system code of the targeted system to customize the operating specification of functions for operational compatibility with the targeted system's operating system code;
    determining whether all lines of code in the legacy source code are accounted for with respect to being associated with one of the user defined representations;
    examining communication and block diagram structures in the legacy source code to determine encapsulation and refactoring opportunities within the operating specification of functions in response to determining that not all lines of code in the legacy source code are accounted for;
    adding an encapsulation and refactoring boundaries to the lines of code in the operating specification of functions for lines of code that are unaccounted for; and
    migrating the compiled legacy source code with the operating specification of functions using the user defined representation(s) into the targeted system for operation of the targeted system using the compiled legacy source code to perform the identified function in the targeted system.

2. The method of claim 1, wherein the user defined representation(s) is in a form comprising: pseudocode, diagrams, descriptive text, tables, or encapsulations.

3. The method of claim 1, wherein the added encapsulation is selected from a library of previously created encapsulations.

4. The method of claim 1, further comprising: determining that the added encapsulation is new; creating a specification for the added encapsulation; and adding specification for the added encapsulation to a library of previously created encapsulations.

5. The method of claim 1, further comprising identifying communication into and out of the legacy system to ensure that all communication with other entities is maintained.

6. A computer program product providing a configurable explicative compiler for use in migrating legacy source code to a targeted system, the computer program product comprising a non-transitory computer readable storage medium having computer readable program code embodied therewith, the computer readable program code being configured to:
    identify a function related to an operation of a legacy machine in the legacy source code independent of a platform source of the legacy source code;
    map the identified function in the legacy source code to a user defined representation(s);
    refactor the legacy source code independent of the platform source, by encapsulating the identified function with the user defined representation of the identified function in a person readable language that is higher than machine language;
    compile the refactored legacy source code;
    determine whether all lines of code in the legacy source code are accounted for with respect to being associated with one of the user defined representations;
    examine communication and block diagram structures in the legacy source code to determine encapsulation and refactoring opportunities within an operating specification of functions in response to determining that not all lines of code in the legacy source code are accounted for;

add an encapsulation and refactoring boundaries to the lines of code in the operating specification of functions for lines of code that are unaccounted for; and provide the compiled legacy source code in a specification for operation of the targeted system.

7. The computer program product of claim 6, wherein the user defined representation(s) is in a form comprising: pseudocode, diagrams, descriptive text, tables, or encapsulations.

8. The computer program product of claim 6, further comprising computer readable program code being configured to recognize overheads functionality of the legacy source code and map the overheads functionality to another user defined representation for compiling.

* * * * *